(12) United States Patent
Johnson et al.

(10) Patent No.: US 9,398,408 B2
(45) Date of Patent: Jul. 19, 2016

(54) GAZE-DIRECTED CONTENT DELIVERY

(71) Applicant: Intel Corporation, Santa Clara, CA (US)

(72) Inventors: Derick A. Johnson, Folsom, CA (US); Thomas A. Birch, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/229,561

(22) Filed: Mar. 28, 2014

(65) Prior Publication Data

US 2015/0281887 A1 Oct. 1, 2015

(51) Int. Cl.
*H04W 4/02* (2009.01)

(52) U.S. Cl.
CPC .............. *H04W 4/021* (2013.01); *H04W 4/026* (2013.01)

(58) Field of Classification Search
CPC ......... G06F 3/013; G06F 3/0346; G06F 3/14; G06F 3/167; G06F 2203/0381; G06F 3/005; G06F 3/012; G06F 3/017; H04S 7/303; H04S 2400/01; H04S 2400/13; H04S 2420/07; H04S 7/307; G02B 6/00; G02B 27/00
See application file for complete search history.

(56) References Cited

U.S. PATENT DOCUMENTS

| 2004/0203863 | A1 | 10/2004 | Huomo |
| 2009/0209267 | A1 | 8/2009 | Jagetiya |
| 2011/0159890 | A1 | 6/2011 | Fortescue et al. |
| 2014/0004885 | A1* | 1/2014 | Demaine ................. G06F 3/016 455/456.3 |
| 2015/0130703 | A1* | 5/2015 | Ghajar .................... G06F 3/005 345/156 |

FOREIGN PATENT DOCUMENTS

| KR | 10-2012-009834 A | 2/2012 |
| WO | 2013147725 A1 | 10/2013 |

OTHER PUBLICATIONS

International Search Report and Written Opinion dated Nov. 28, 2012 for International Application No. PCT/US2012/030483.

* cited by examiner

*Primary Examiner* — Kashif Siddiqui
(74) *Attorney, Agent, or Firm* — Jordan IP Law, LLC

(57) ABSTRACT

Methods and systems may provide for associating content in a cloud computing infrastructure with geo-panes and sending it to a location aware device based on user gaze. The content may be restricted by rules, including distance from user to the geo-pane. The geo-panes may be static or mobile in space.

22 Claims, 11 Drawing Sheets

GAZE-DIRECTED CONTENT DELIVERY

BACKGROUND

Geo-location technologies such as GPS (Global Positioning System) may be used by smart phones and other GPS-equipped devices to obtain content on locations of interest to a user of that device based on the user's geographic location. In some applications, images selected by the user may be analyzed for their content in order to determine their identity. Such image analysis, however, may be computationally demanding and may remain prone to error. These challenges may hinder the development of content delivery based on geo-location technology.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Various geo-location technologies exist to enable one to determine the location of a location aware device. A location aware device may be any device that has the capability of making use of geo-location technology to locate the device on a map or in a coordinate system. Examples of such technologies include those based on Global Positioning Systems (GPSs), such as are now in widespread use in smart phones; radar; sonar; indoor GPS systems; near-field communication (NFC); cellular tower triangulation systems; Wi-Fi and Wi-Fi triangulation systems; Radio Frequency Identification systems (RFID); laser positioning systems; and Bluetooth systems, which are used primarily in localized settings.

These technologies may be employed by location aware devices. Examples of devices with such capabilities include tablets, notebook computers, smart phones, smart glasses, image capture devices, mobile internet devices (MIDs), game console, media players etc. More broadly, a location aware device may be any device that is aware of its location with respect to a coordinate system. It may have the ability to transmit its location or data determinative of its location to another device or to a system, which may be local to it or more distant, such as in the cloud. That coordinate system may be defined in some local space, such as a room or building, or it may cover wide swaths of the planet, such as GPS. It may be based on any known mathematical system, including Cartesian coordinates, cylindrical coordinates, spherical coordinates etc. With respect to GPS, which is amenable for use with embodiments disclosed herein, the coordinates are latitude, longitude, and altitude. While most of the embodiments here are described in terms of GPS, it is understood that embodiments may utilize these other systems or other mathematically acceptable coordinate system.

At present, GPS is the most widely used of these systems. Although initially developed for the military and made available for civilian use only with hobbled capabilities, GPS is now available with a geographic resolution that is generally accurate within several meters and improving. GPS capabilities are now tightly woven into smart phones, and provide latitude and longitude measurements by which users of these devices locate themselves on city maps. Less well known may be that GPS systems may also provide altitude information. Hence, a GPS is an example of a geo-location system that is capable of locating the user by latitude, longitude, and altitude. Also, GPS accuracy may be enhanced by use of supplemental systems such as various ground-based augmented GPS systems. One such system, Nationwide Differential GPS System (NDGPS), offers accuracy to within 10 cm. Altitude measurements may be augmented by use of barometric pressure sensors and other devices available for measuring altitude. Alternatively, altitude may be determined via triangulation devices and by using Wi-Fi access points, which have been used to determine the particular floor of a multi-story building that a user may be in.

GPS location may also form the origin of a locally defined three dimensional (3D) coordinate system.

Many location aware devices may now be equipped with hardware that enables them to determine their orientation as well as position. For example, smart phones may now be equipped with an accelerometer, gyroscope and a magnetometer, and with the sensor data provided by these components, the direction in which the device is oriented may be determined using basic vector mechanics and for example, well known techniques employed in smart phone design.

The embodiments disclosed herein make use of geo-location technology to provide the user of a location aware device pointing in a particular direction with content associated with that direction, as shall be explained further below.

Figure 1A:
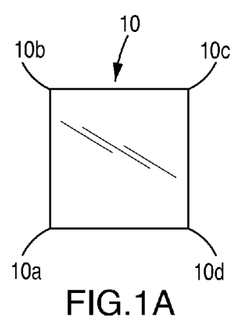
FIGS. 1A, 1B and 1C show three examples of geo-pane geometries according to embodiments.

As used herein, the term "geo-pane" may refer to a two dimensional pane of space and the virtual frame, known as a "geo-frame," that bounds it. A geo-pane may be defined by its coordinates, and these coordinates may be taken at whatever location on the geo-frame is most appropriate. One simple example of a two dimensional (2D) geo-pane is shown in FIG. 1A, in which the geo-pane is a rectangle having four corners 10a, 10b, 10c, 10d. Here, the geo-pane may be defined by the coordinates of its four corners, or at the centers of each of its four sides. The geo-frame may be a square, rectangular or any other sort of polygon, a circle or an ellipse. Where the illustrated geo-pane is a polygon, it may be most convenient to define it in terms of the coordinates of its vertices. In the case of a circular geo-pane, the geo-pane may be defined by indicating its center and radius. Since the geo-pane is bound by its frame, anything that is contained within the boundaries of the geo-frame may be associated with that geo-pane.

Figure 1B:
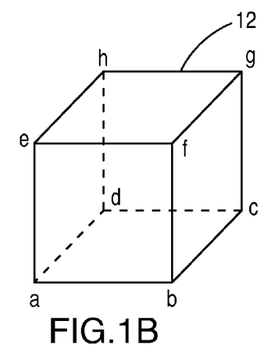
Figure 1C:
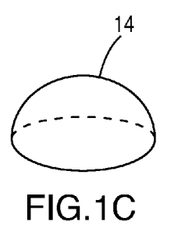

A geo-pane may also be three dimensional volume of space, such as a cube 12 (FIG. 1B) having vertices 12a, b, c, d, e, f, as well as a box, right cylinder, polyhedron, sphere, hemisphere 14 (FIG. 1C), or any portion thereof that may be used to define a volume of space. Hence, there are 2D geo-panes that determine two dimensional regions and 3D geo-panes that enclose volumes.

A geo-fence may be a virtual fence in which GPS or other positioning system is used to define the boundaries of some physical space. It may be two dimensional, in that it is defined in terms of ground coordinates only, or it may be bounded above and below and be three dimensional. A geo-fence may be of any bounded shape. A geo-fence may be used to define a region of space that contains a 2D or 3D geo-pane, and it may be associated with a 2D or a 3D geo-pane whether or not the geo-pane is located inside the geo-fence.

Geo-panes may be defined by location aware devices. For example, the 2D geo-pane of FIG. 1A may be defined by placing a location aware device at its four corners and obtaining the coordinates there in GPS or other system. Similarly, a 3D geo-pane may be defined by placing the location aware device at its vertices or at points in space sufficient to bound some region of interest. According to another embodiment, a 3D geo-pane may be defined in terms of a single 2D geo-pane that has been mathematically thickened to provide depth. The located points may correspond to something physical, like the perimeter of a statue or the corners of a wall, or they may simply be points in space of interest to someone.

Once defined, a geo-pane may be regarded as property, having an owner to whom it is registered in a database. Alternatively, it may be dedicated to the public, or subject to an open license for use by others. Ownership of the geo-pane may be separate from ownership of any real object within its coordinates, or they may be bundled together.

Figure 2:
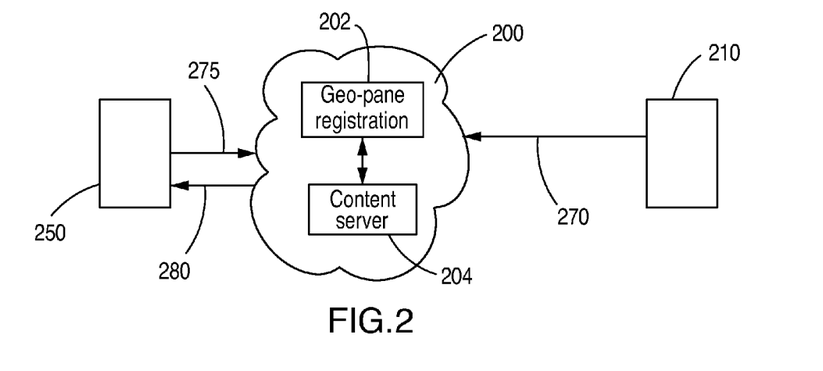
FIG. 2 is a block diagram of an example illustrating the connections among a location aware device, a geo-pane, and a cloud computing infrastructure according to an embodiment.

The process of defining and using geo-panes according to one embodiment is illustrated at a top-level form in FIG. 2. A location aware device 210 forwards the geo-coordinates 270 that define the geo-pane to a geo-pane registration server 202 in the cloud 200 (e.g., a cloud computing infrastructure), where it may be registered to an owner. Also provided to the cloud, and by any device capable of accessing the cloud 200, such as a smart phone or a computer, may be such other identifying information as the owner of the geo-pane may regard as useful for subsequent operation, including billing information and any such other information as may be provided. Any content that the owner may wish to associate with that geo-pane may be stored in a content server 204 for gaze-based access by a device 250, which forwards various sensor data 275 to the cloud and which may receive content 280 in return, as is explained in greater detail below.

This same technique may also be used to define geo-fences. A geo-fence may contain one or more geo-panes, either 2D or 3D, or be associated with a geo-pane that it does not contain. As with geo-panes, a geo-fence may be registered in the cloud to an owner.

Within the cloud 200, the creator/owner of the geo-pane may also provide downloadable content to be associated with that particular geo-pane. The content may take any form that may be made use of by the accessing location aware device, including text, video, music, narration, images, graphics, software, firmware, email, web pages, applications, e-services, voice, data, etc. It may be offered free of charge, or for a fee.

Figure 3:
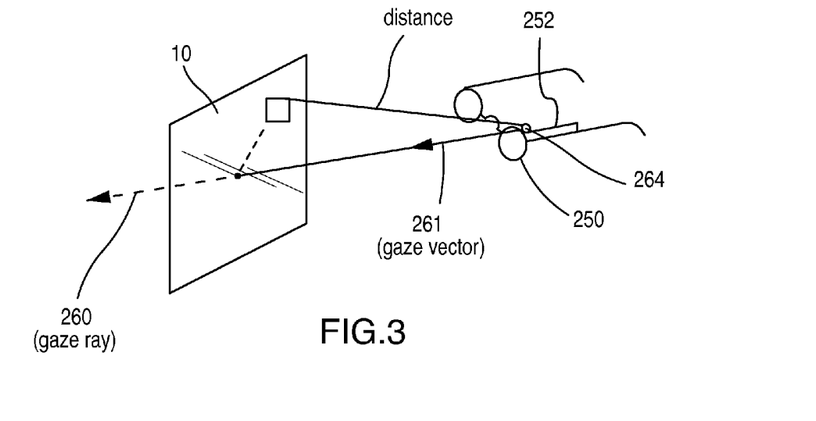
FIG. 3 illustrates an example of a geo-pane in conjunction with a gaze vector according to an embodiment.

As noted above, in addition to obtaining its location in space, a location aware device may, using an internal/embedded accelerometer, gyroscope, magnetometer, etc., also establish its orientation in space. That is to say, taking the location of the device as an origin, the direction of orientation may be defined. In the example of FIG. 3, the location aware device is a pair of smart glasses 250 equipped with a camera 252 such that in use its orientation will be more or less coincident with the gaze direction of the wearer. The gaze direction may be expressed mathematically in terms of a gaze ray 260 having its origin 264 at the GPS location of the device, or as a gaze unit vector 261 pointing along that ray, or as a set of direction cosines, depending on the particular mathematical formalism one may wish to employ. Whatever the formalism employed, a location aware device may "know" both its location and its orientation.

More generally, device orientation will normally be determined in terms appropriate to the physical nature of the location aware device in question. Where the device is a camera or other optical device, one natural way of defining the orientation is to look to the orientation of the optical path as seen through the view finder. Recently, so-called "smart glasses" have been developed (such as those marketed by Google®). It is natural to define the orientation of such a device as the direction of the user's gaze when wearing them and looking at some location or object of interest. Other devices where there may be some preferred direction of orientation (which for lexicographical compactness is called "gaze" herein regardless of the device in question) are smart watches, wearables, helmet mounted devices, and smart phones where the user chooses to define some orientation. A wand might be adapted to include GPS, and then by pointing the wand in a specific direction one defines a gaze for the wand. Similarly, a game controller may be designed to have a gaze.

Figure 4:
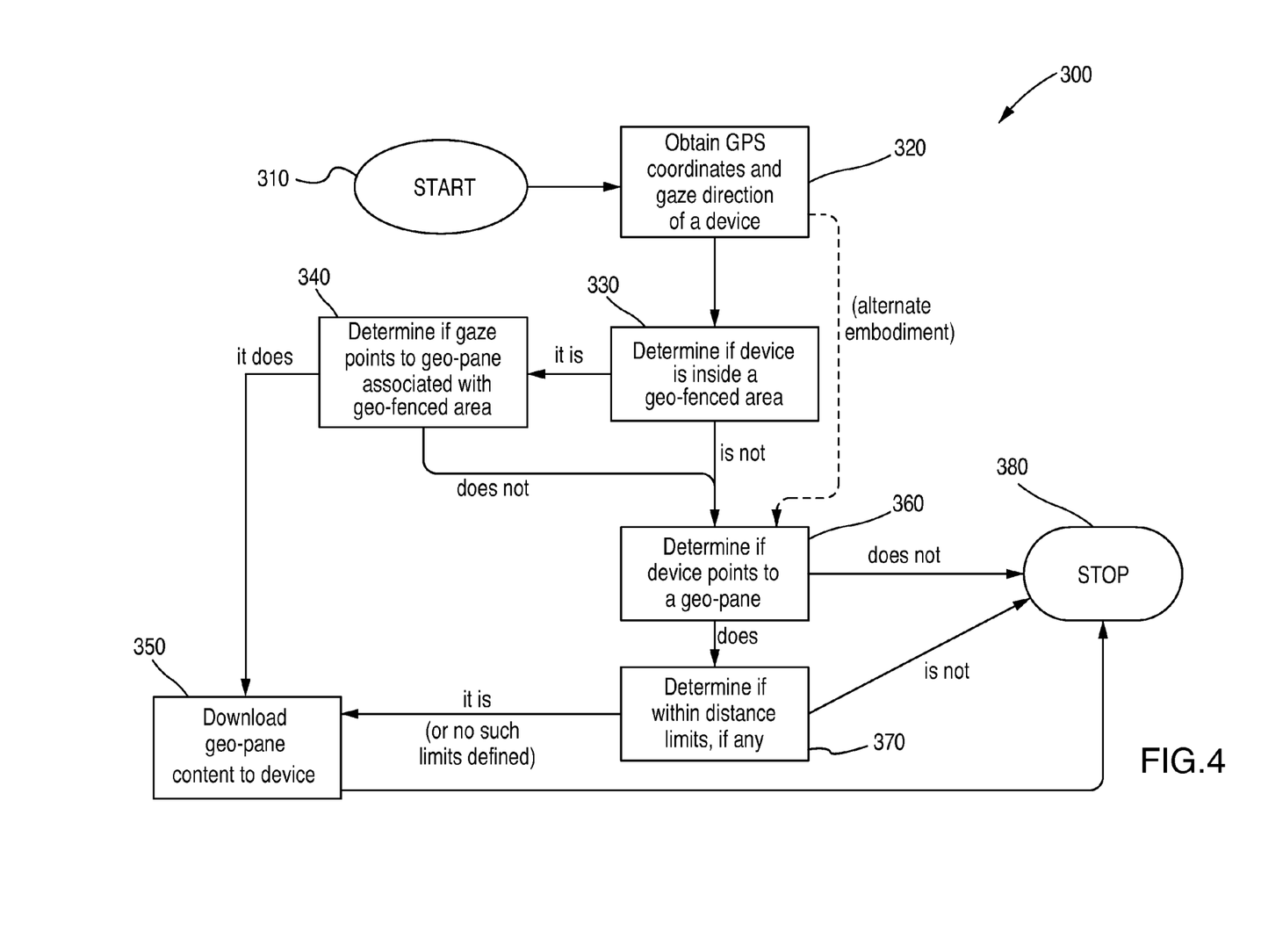
FIG. 4 is a flowchart of an example of a method of providing content based on user gaze according to an embodiment.

The operation of one embodiment is further addressed by way of reference to the flow chart 300 in FIG. 4. The method 300 may be implemented as a module in set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 300 may be written in any combination of one or more programming languages, including an object oriented programming language such as Java, Smalltalk, C++ or the like and conventional procedural programming languages, such as the "C" programming language or similar programming languages.

At start processing block 310, the user initiates a request for information on something the user sees. This may or may not correspond to a known geo-pane for which content exists. Typically, the user will initiate a request because the context of the user's location suggests that such information may be available through his or her directed gaze. At illustrated block 320, the GPS coordinates as well as the orientation of gaze are forwarded to the cloud, where a database (which may be resident in the geo-pane registration server 202 of FIG. 2) and/or additional computational or relational software determines at block 330 whether his GPS coordinates are inside a known geo-fence.

If the user's GPS coordinates are inside a known geo-fence, then the system may calculate in block 340 whether the gaze points to a geo-pane associated with the area inside the geo-fenced area. If it does, then in block 350 the content associated with that geo-pane may be downloaded to the user's device.

Should it be determined in illustrated block 330 that the user is not inside a geo-fenced area, or, in illustrated block 340, that he is but that there is no content available within it to match his gaze, then at block 360 it may be determined whether the user's gaze is pointing to any geo-pane, no matter the distance. If it is not, then there is nothing to download and the process may terminate at block 380 until it is invoked again, either by the user manually invoking it or automatically through the movement of the user some predefined distance.

On the other hand, if it is determined in block 360 that any geo-panes may be identified as being in line with the user's gaze, certain distance rules may be brought into play at block 370. The user may be free to define for the system the effective range of his gaze. For example, he may only be interested in geo-panes that are within five meters of his position. Or he may select a greater distance, out to his effective horizon or beyond. Alternatively, the owner of the geo-pane may have set up the registration of his geo-pane with a set of rules so that content is delivered only to those devices that are within a certain predetermined distance of the location of the geo-pane. Alternatively, the distance may be undefined by either party, and subject to rules determined by default to system rules in the cloud or the location aware device. If the distance rules are met, then the content is delivered to the device at block 350. Otherwise, the process again terminates until the user moves some distance or manually requests a new search for content.

While the previous embodiment employs geo-fencing, according to another embodiment geo-fencing is not used. In this embodiment, the flow chart by-passes blocks 330 and 340. The device GPS coordinates and gaze direction may be obtained at block 320, and it may be determined at block 360 whether the gaze direction intercepts a geo-pane. If it does and if any defined distance limitations are met, then the content associated with the geo-pane may be downloaded to the device at block 350 as before.

The illustrated arrangement may be, insofar as the user is concerned, simplicity itself. Merely by gazing at an object, she may obtain additional content concerning it. When the user is wearing smart glasses, simply looking at an object suffices to provide additional information and content associated with that object.

The owner or registrant of the geo-pane may be given broad authority to determine the circumstances under which content will be provided. Hence, according to another rule that may optionally be used, content is delivered only to paying customers or to those who have met some other standards defined by the owner of the geo-pane.

Figure 5:
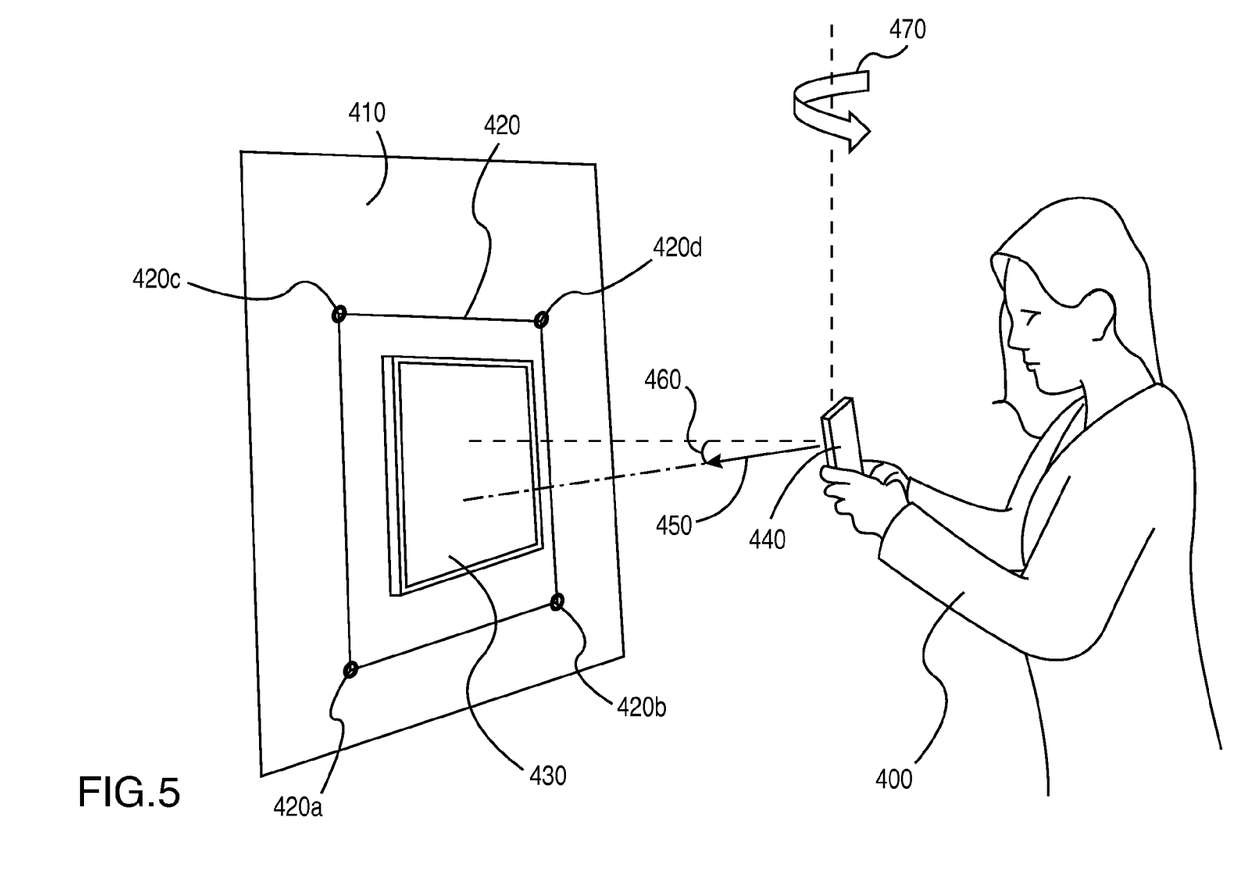
FIG. 5 illustrates an example of an embodiment employing a 2D geo-pane.

FIG. 5 illustrates an embodiment and its use in a museum-like setting. A user 400 stands in front of a painting 430 mounted to a wall 410. She is holding a location aware smart phone 440 having an optical system that defines a gaze vector 450. In this instance, the gaze vector 450 is pointed in the direction of the painting 430. The painting 430 is located within a geo-pane 420 that is generally aligned with the wall 410 to which the painting has been mounted. The illustrated geo-pane 420 is defined by the coordinates of its corners 420*a*, 420*b*, 420*c*, 420*d*, which contain information regarding the latitude, longitude, and altitude of the corner or some other coordinate information that may be related to the GPS coordinates of the device held by the woman. Either automatically or by manually invoking an application, the smart phone may transmit its GPS coordinates and its orientation, i.e., the gaze vector 450, to the cloud. In this embodiment, the gaze vector 450 is determined in terms of a device pitch 460 and a device bearing 470, although any known approach for determining an orientation may be employed.

In the cloud, servers may determine if there is a geo-pane within some defined distance of the smart phone. That distance may be set by the user using their smart phone, or by the owner of the geo-pane in question. If the smart phone 440 is located within the defined range of the geo-pane, and if the gaze vector 450 lies along a line that intersects the geo-pane, then the cloud may download content of interest to the smart phone. For example, in a museum setting, by pointing at a painting, the user could receive information on its history or other works by that same artist.

Figure 6A:
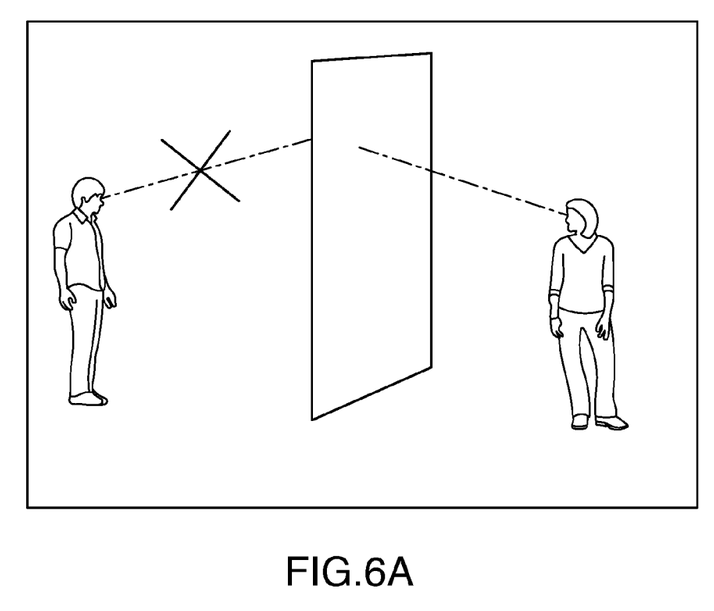
FIGS. 6A and 6B show examples of unidirectional and bidirectional 2D geo-panes, respectively, according to embodiments.
Figure 6B:
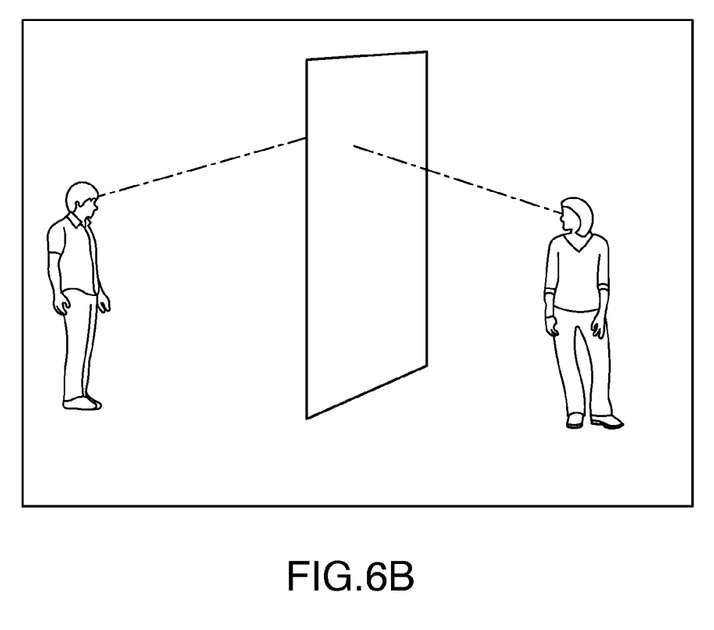

Geo-panes may be unidirectional, as shown in FIG. 6A, or bidirectional as is shown in FIG. 6B. In the unidirectional case (FIG. 6A), only users on one side of the geo-pane—in this instance, the woman on the right—receive content about it. In a bidirectional geo-pane (FIG. 6B), users on either side of the geo-pane may receive the same content. Alternatively, each side may receive its own unique content, which may be of value in perspective-specific displays. If the user is wearing smart glasses, this content may further vary with the user's gaze direction as the user turns his head. One way of providing such selective directionality to the geo-pane is to note its frame orientation so that the cloud knows when the user is standing in front of it versus behind it. Such an approach may be useful in, for example, the museum setting in which wall-mounted paintings are viewed. While the person in the room with the painting would want to see that content, another person in the adjoining room (still within range of the painting) would not.

Figure 7A:
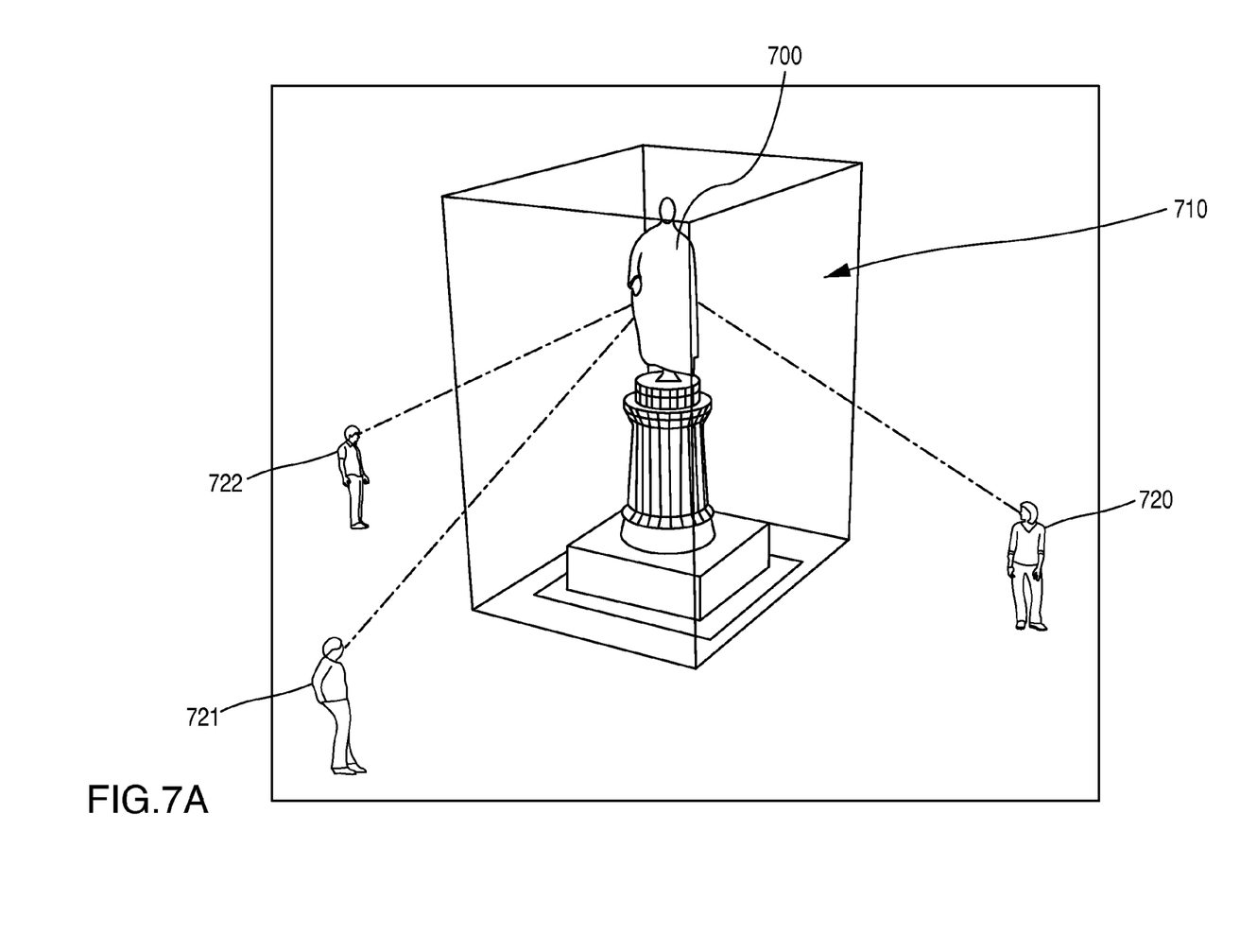
FIGS. 7A and 7B show examples of embodiments using inbound only and outbound only 3D geo-panes, respectively.
Figure 7B:
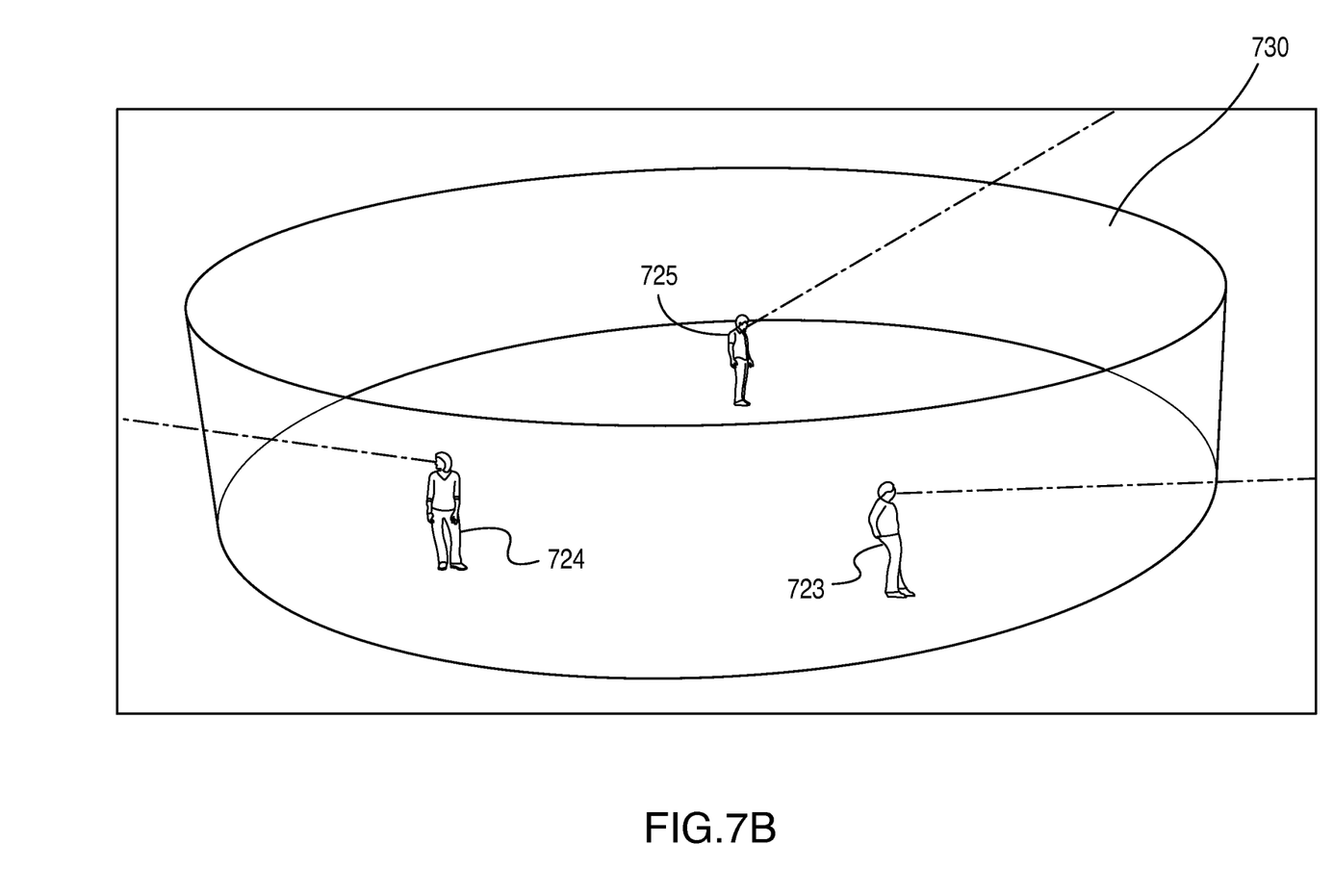

3D stand-alone geo-panes, such as are shown in FIGS. 7A and 7B, have volume. In the embodiment of FIG. 7A, a statue 700 has been geo-paned, i.e. located in a box-shaped 3D geo-pane 710 so that users on any side looking in (here users 720, 721, 722) may see content or information relevant to the statue no matter which side they are on. The illustrated approach is an example of an inbound only geo-pane, in which content is only displayed if an individual is looking into the geo-pane. Someone standing on the statue platform and looking out would not see this content. In still other embodiments some sides may be active and provide content while others are not.

In the embodiment in FIG. 7B there is shown an outbound-looking 3D geo-pane 730 in the shape of a capped cylinder, where users 723, 724, and 725 standing inside the volume of the geo-pane looking out may access whatever content may be associated with an outbound gaze, which may or may not be the same for all users inside the geo-paned area, but those on the outside looking in do not see any of that content.

Figure 8A:
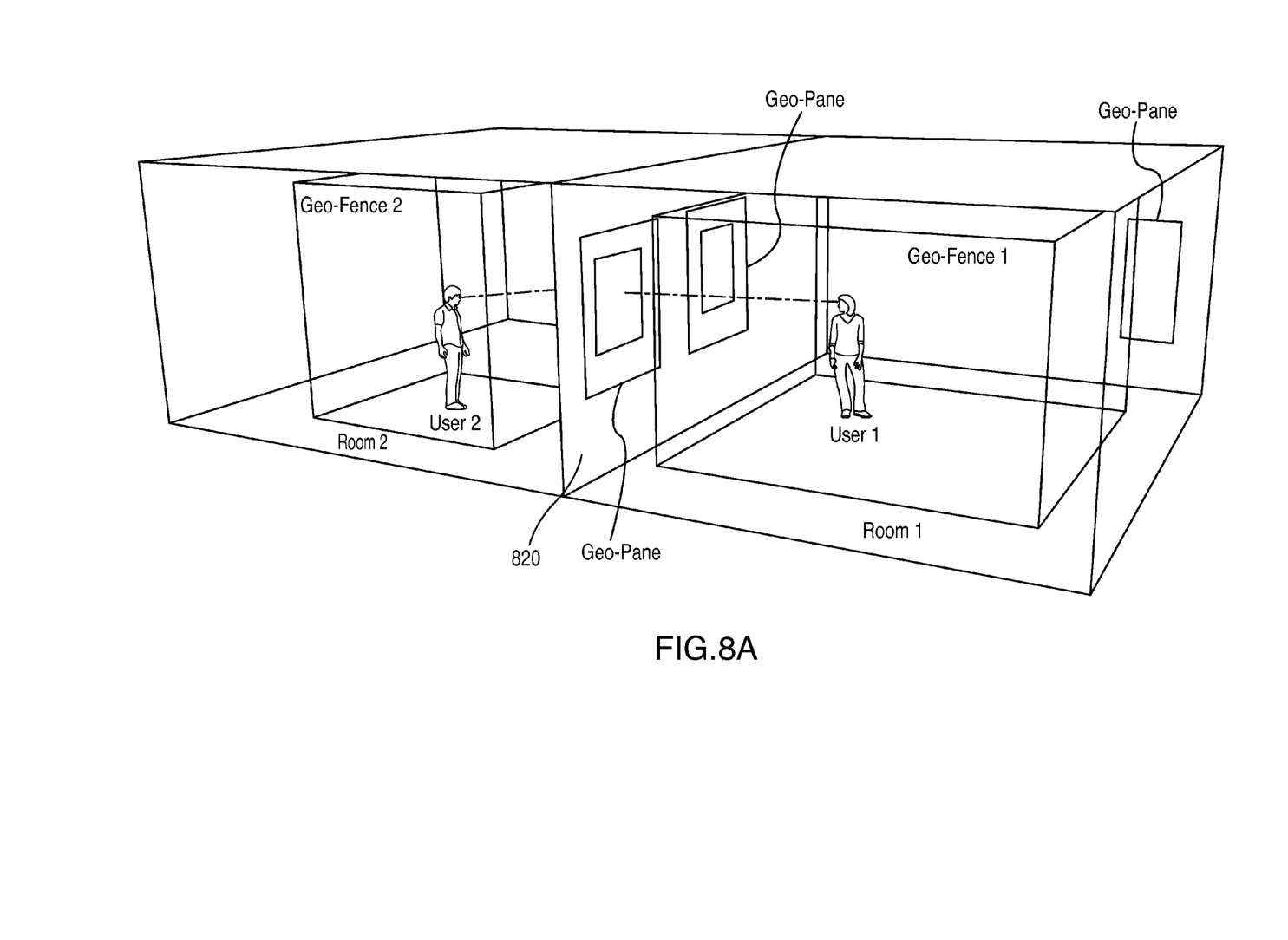
FIGS. 8A and 8B illustrate examples of an embodiment employing geo-fencing.
Figure 8B:
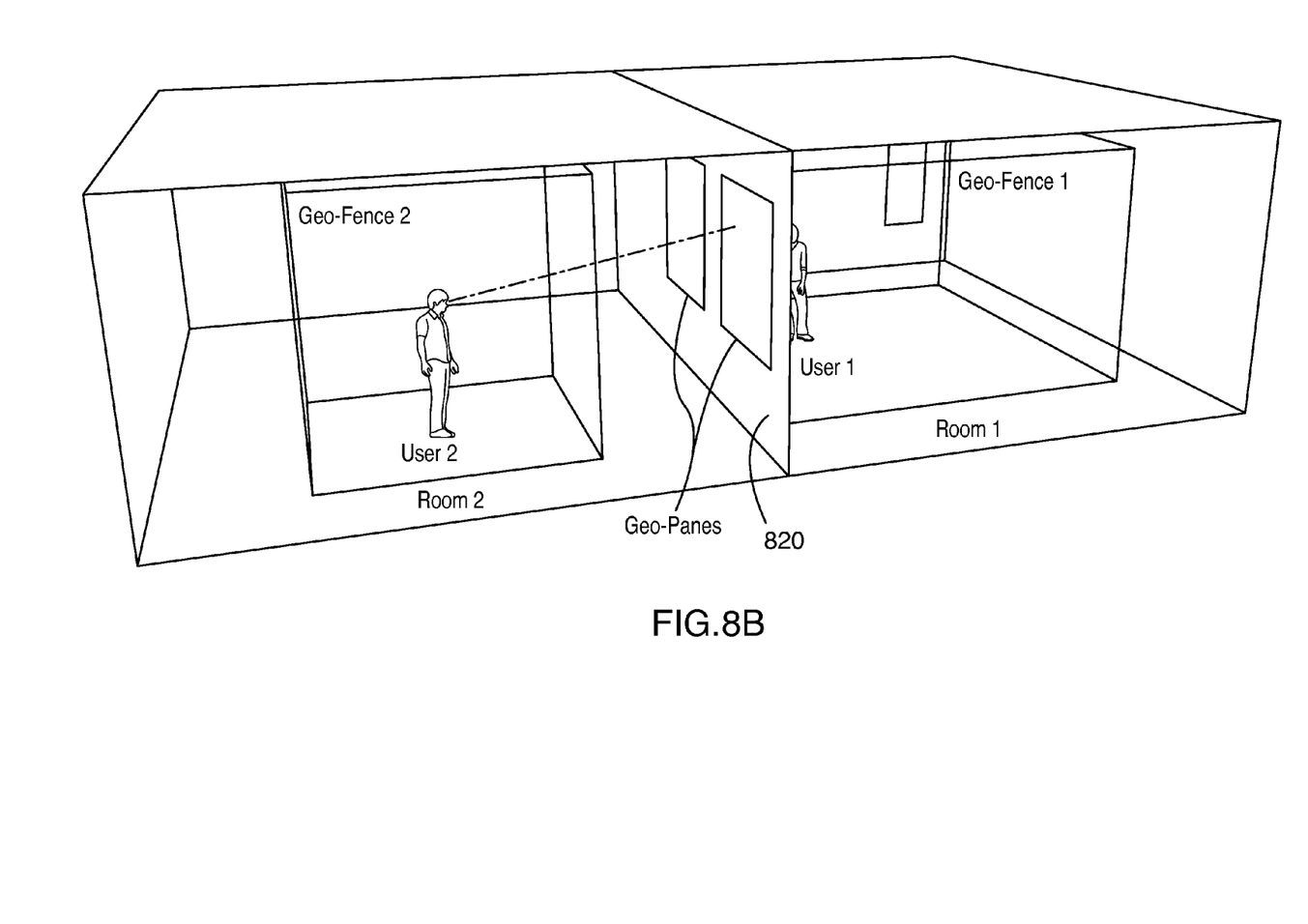

Another embodiment combines geo-panes with geo-fences. Again consider the case of paintings hanging on display in a museum, as in FIGS. 8A and 8B. Two people standing in adjoining rooms 1 and 2 separated by a common wall 820 on either side of which hang different paintings, in addition to other paintings that may be in each room. The two people may both be staring at the same wall and at the same distance from it, but as there is a different painting on each side they do not want to see any content concerning the unseen painting in the adjacent room. To provide each person with content specific to what his eyes actually see and not of what lies beyond on the other side of the wall, this embodiment includes 3D geo-fences, which are volumes with which 2D and 3D geo-panes may be associated, whether or not they are actually inside the boundaries of the geo-fence. In this example, room 1 has a geo-fence 1 and room 2 has a geo-fence 2. Any objects of interest in each room may be associated with a particular geo-pane, and the geo-fences are associated with these geo-panes in a data base. Hence, any user standing in room 1 will also be inside geo-fence 1, and she will have access only to the data associated with the geo-panes that have been associated with the geo-fence in that room. And similarly, the user in the adjacent room would be inside geo-fence 2 and have access to the different geo-pane content associated with that geo-fence in that room. A user's gaze may intersect geo-panes in adjoining rooms but so long as he is in the correct geo-fenced area, he will have access to the correct content. Using wearable smart glasses or other augmented reality device, one may obtain such additional information about the painting he is gazing at as the owner of the museum may wish to provide.

The spatial resolution of this system may be affected by the particular geo-location technology employed, and one system may prove more useful in a given context than another. One may also combine systems, using GPS up to the limits of its resolution, and employing other systems with higher resolutions to augment it. The present embodiments are not limited to any one system for geo-location.

In the preceding embodiments, the geo-panes are static, i.e., they may be fixed in space. However, geo-panes may be mobile, as may be geo-fences, provided the locating coordinates are updated as they move about. For example, using device location information in possession of a user, a 3D geo-pane may be automatically created around the user with public profile information as the content. This geo-pane would move with the person and thus in at least this sense could be considered to be mobile. Thus, one may create personalized geo-panes that accompany individuals as they move about. Then another user provided with a location aware device according to the embodiments here (e.g., Google Glasses®) would be able to gaze upon the other user within the geo-pane and swiftly download information from the cloud concerning them such as name, job title, etc. Such an approach may be much simpler than capturing an image of a person, and then forwarding it to a service for image analysis and identification. Also, it provides the owner of the geo-pane with control over his content, and he may limit access to devices having the proper permissions.

By using a geo-location system with a spatial resolution sufficient to the task at hand, creation of geo-panes and geo-fences may be a simple matter of identifying, for example, the vertices, corners, edges, centers, or center faces of areas of interest and transmitting those coordinates to a server or other store of data where it may be associated with content.

As used herein, gaze may refer to the direction a location aware device is pointed, or it may refer to a direction vector of unit magnitude (e.g., one meter, if MKS is used) having its origin (i.e., its tail end) at the coordinates of the device. Alternately, the term "gaze vector" may refer to a ray beginning at the coordinates of the location aware device and stretching out to infinity. Each may convey the same idea, that a direction is specified that points from the device (which is the user if he is wearing smart glasses) to something of interest to him. It is well within the knowledge of engineers familiar with vector mechanics to work with any or all of these formulations.

Communication with the cloud may be conducted via one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks.

Further examples of a location aware device may include computers that are arranged to be worn by a person, such as a wrist computer, finger computer, ring computer, eyeglass computer, belt-clip computer, arm-band computer, shoe computers, clothing computers, and other wearable computers. In embodiments, for example, a location aware device may be implemented as a smart phone capable of executing computer applications, as well as voice communications and/or data communications.

Figure 9:
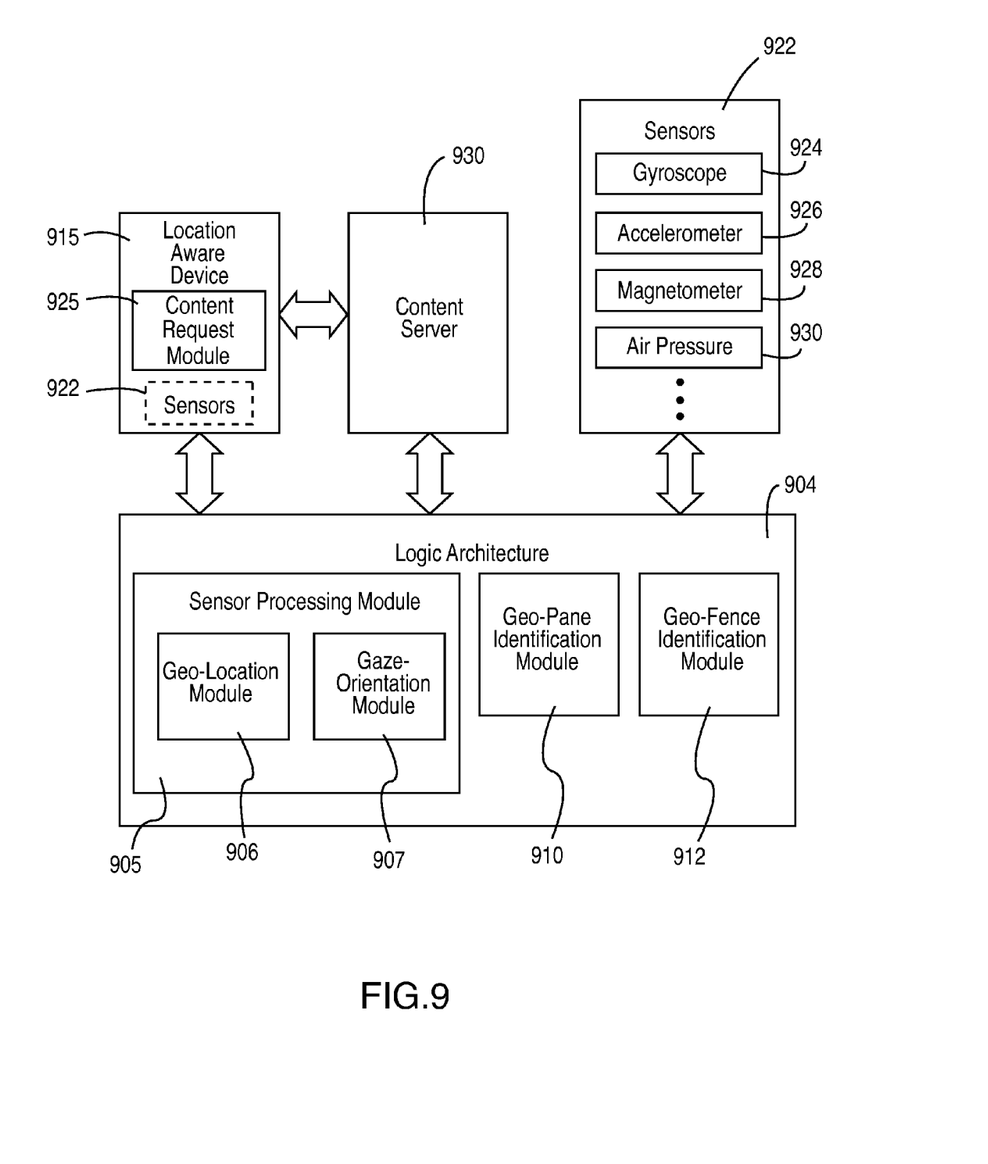
FIG. 9 is a block diagram of an example of a logic architecture according to an embodiment.

Turning now to FIG. 9, a logic architecture 904 is shown, wherein the logic architecture may generally implement one or more aspects of the method 300 (FIG. 4) already discussed above. In the illustrated example, the logic architecture 904 may include a sensor processing module 905 that comprises a geo-location module 906 and a gaze-orientation module 907. Also provided are a geo-pane identification module 910 and a geo-fence identification module 912. A location aware device 915, such as a smart phone, may include a number of sensors 922 of use in determining the geo-location of the location aware device 915. These sensors may include a gyroscope 924, an accelerometer 926, a magnetometer 928, and an air pressure sensor 930. Data provided by these sensors 922 may be utilized within sensor processing module 905 by the geo-location module 906 and gaze orientation module 907 to determine the geo-location and the gaze orientation of the device. Geo-pane identification module 910 utilizes this information to identify any geo-panes to associate with the direction of gaze, as discussed previously. Where geo-fences are employed, the geo-fence identification module uses the geo-location of the device to determine if there are any geo-fences to take into account.

The location aware device 915 may include a content request module 925 that requests content associated with geo-panes identified in the logic architecture 904. If suitable content is identified, it is downloaded from the content server 930 to the location aware device 915.

Figure 10:
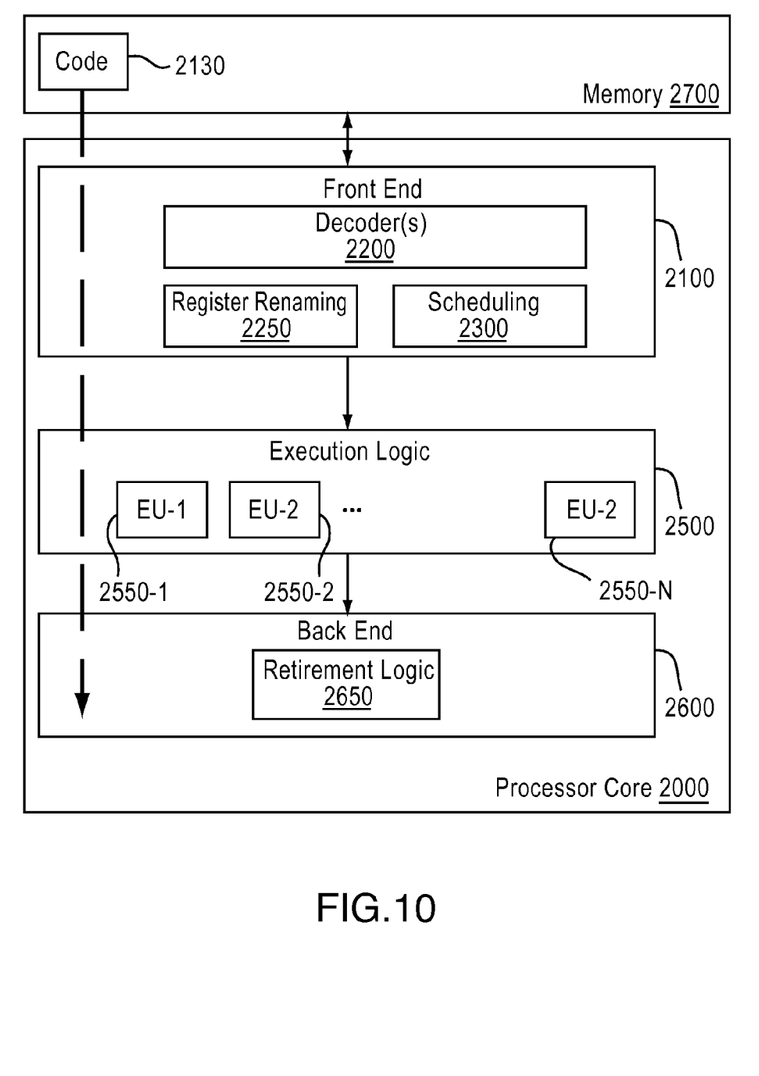
FIG. 10 is a block diagram of an example of a processor according to an embodiment.

FIG. 10 illustrates a processor core 2000 according to one embodiment. The processor core 2000 may be the core for any type of processor, such as a micro-processor, an embedded processor, a digital signal processor (DSP), a network processor, or other device to execute code. Although only one processor core 2000 is illustrated in FIG. 10, a processing element may alternatively include more than one of the processor core 2000 illustrated in FIG. 10. The processor core 2000 may be a single-threaded core or, for at least one embodiment, the processor core 2000 may be multithreaded in that it may include more than one hardware thread context (or "logical processor") per core.

FIG. 10 also illustrates a memory 2700 coupled to the processor core 2000. The memory 2700 may be any of a wide variety of memories (including various layers of memory hierarchy) as are known or otherwise available to those of skill in the art. The memory 2700 may include one or more code 2130 instruction(s) to be executed by the processor core 2000, wherein the code 2130 may implement the method (FIG. 4), already discussed. The processor core 2000 follows a program sequence of instructions indicated by the code 2130. Each instruction may enter a front end portion 2100 and be processed by one or more decoders 2200. The decoder 2200 may generate as its output a micro operation such as a fixed width micro operation in a predefined format, or may generate other instructions, microinstructions, or control signals which reflect the original code instruction. The illustrated front end 2100 also includes register renaming logic 2250 and scheduling logic 2300, which generally allocate resources and queue the operation corresponding to the convert instruction for execution.

The processor core 2000 is shown including execution logic 2500 having a set of execution units 2550-1 through 2550-N. Some embodiments may include a number of execution units dedicated to specific functions or sets of functions. Other embodiments may include only one execution unit or one execution unit that can perform a particular function. The illustrated execution logic 2500 performs the operations specified by code instructions.

After completion of execution of the operations specified by the code instructions, back end logic 2600 retires the instructions of the code 2130. In one embodiment, the processor core 2000 allows out of order execution but requires in order retirement of instructions. Retirement logic 2650 may take a variety of forms as known to those of skill in the art (e.g., re-order buffers or the like). In this manner, the processor core 2000 is transformed during execution of the code 2130, at least in terms of the output generated by the decoder, the hardware registers and tables utilized by the register renaming logic 2250, and any registers (not shown) modified by the execution logic 2500.

Although not illustrated in FIG. 10, a processing element may include other elements on chip with the processor core 2000. For example, a processing element may include memory control logic along with the processor core 2000. The processing element may include I/O control logic and/or may include I/O control logic integrated with memory control logic. The processing element may also include one or more caches.

Figure 11:
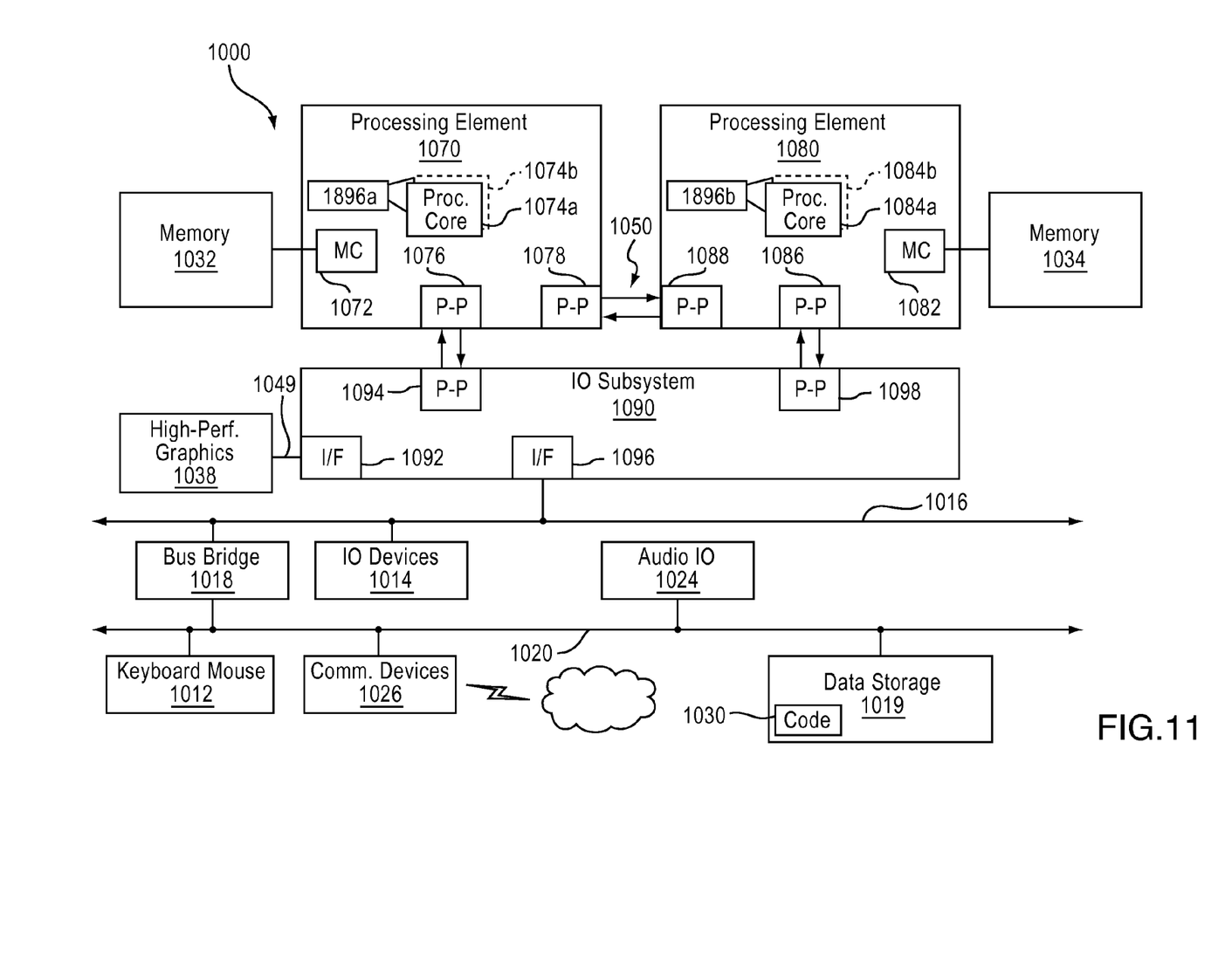
FIG. 11 is a block diagram of an example of a system according to an embodiment.

Referring now to FIG. 11, shown is a block diagram of a system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 10.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 11, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method already discussed with respect to FIG. 4 or any embodiment herein, and may be similar to the code 2130 (FIG. 10), already discussed. Further, an audio I/O 1024 may be coupled to second bus 1020.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

Additional Notes and Examples

Example 1 may include a system to provide content to a device comprising a gaze orientation module to determine a gaze direction based on sensor-based information, and a geo-pane identification module to identify regions of space and associate content with said regions of space based on the gaze direction.

Example 2 may include the system of Example 1, further comprising a geo-location module to determine device coordinates within a coordinate system, wherein content is associated with said regions of space based on the device coordinates.

Example 3 may include the system of Example 1, wherein at least one of the modules is integrated into a device that is wearable about a portion of the human body.

Example 4 may include the system of Example 1, wherein content is associated with geo-panes.

Example 5 may include the system of Example 1, wherein said content and data defining geo-panes are registered to an owner.

Example 6 may include the system of any of Examples 1-5, further comprising a device for use in game play.

Example 7 may include the system of any of Examples 1 or 3-6, further comprising a content server, a geo-fence identification module to identify fenced regions of space, and a geo-location module to determine device coordinates within a coordinate system, wherein content is associated with said regions of space based on the device coordinates.

Example 8 may include the system of any of Examples 1-6, further comprising a mobile device, wherein a user of the mobile device may select content based on an orientation of said device.

Example 9 may include a method to provide content to a device, comprising obtaining spatial coordinates and an orientation of a device, said orientation defining a gaze direction, identifying a geo-pane based on the spatial coordinates and the gaze direction, and providing content to the device that is relevant to the geo-pane.

Example 10 may include the method of Example 9, wherein the geo-pane is three dimensional.

Example 11 may include the method of Example 9, further including determining whether the spatial coordinates of the device lie within a geo-fence, and determining whether there are any geo-panes associated with said geo-fence, wherein providing the content to the device includes providing content concerning the geo-pane associated with the geo-fence to which the device is pointing.

Example 12 may include the method of any of Examples 9-11, wherein the spatial coordinates are obtained through a combination of geo-location systems, at least one of which is local to the device.

Example 13 may include the method of Example 7, further including registering ownership of a geo-pane with a registrar.

Example 14 may include the method of Examples 9 or 11, further including establishing a rule set to determine whether content is to be made available.

Example 15 may include the method of Examples 7 or 9, wherein the rule set comprises rules that control content delivery to devices located within a predetermined range of the geo-pane.

Example 16 may include the method of Example 9, wherein the geo-pane is mobile.

Example 17 may include the method of Example 9, wherein the content that is relevant to a geo-pane varies with a gaze direction of a user.

Example 18 may include the method of Examples 9 or 16, wherein the geo-panes are utilized in game play.

Example 19 may include the method of Example 9, wherein content is associated with geo-panes.

Example 20 may include at least one computer readable storage medium comprising a set of instructions which, when executed by one or more servers, cause the server to obtain spatial coordinates and an orientation of a device, said orientation defining a gaze direction, identify a geo-pane based on the spatial coordinates and the gaze direction, and provide content to the device that is relevant to the geo-pane.

Example 21 may include the at least one computer readable storage medium of Example 20, wherein the instructions, when executed, cause the server to obtain spatial coordinates through a combination of geo-location systems, at least one of which is local to the device.

Example 22 may include the at least one computer readable storage medium of Example 20, wherein the instructions, when executed, cause the server to restrict content delivery to devices located within a predetermined range of the geo-pane.

Example 23 may include the at least one computer readable storage medium of any of Examples 20-22, wherein the instructions, when executed, cause a server to vary delivery of content with the gaze direction.

Example 24 may include the at least one computer readable storage medium of Example 20, wherein the instructions, when executed, cause the server to determine whether the spatial coordinates of the device lie within a geo-fence, and determine whether there are any geo-panes associated with said geo-fence, wherein providing the content to the device includes providing content concerning a geo-pane associated with a geo-fence based on gaze direction.

Example 25 may include a mobile device comprising one or more sensors, a geo-location module to use sensor-based information from the one or more sensors to determine the location of the mobile device, an orientation module to use information from the one or more sensors to determine an orientation of the mobile device, and a content request module to request the delivery of content to the mobile device based at least partly on the orientation of the device and its location.

Example 26 may include the mobile device of Example 25, wherein the sensor-based information is provided by at least one sensor selected from a group consisting of a gyroscope, magnetometer, barometer, pressure sensor, and accelerometer.

Example 27 may include the mobile device of Example 25, wherein the sensor-based information can at least partially define coordinates of a geo-pane.

Example 28 may include at least one computer readable storage medium comprising a set of instructions which, when executed by a mobile device, cause the mobile device to determine the location of the mobile device, determine an orientation of the mobile device, and request the delivery of content to the mobile device based at least partly on the orientation of the device and its location.

Example 29 may include the at least one computer readable storage medium of claim 28, wherein the mobile device comprises sensors.

Example 30 may include a method of providing content to a mobile device, comprising obtaining spatial coordinates and orientation of a device, said orientation defining a gaze direction, determining whether the gaze direction points to a geo-pane, and providing content to the device that is relevant to the geo-pane.

Example 31 may include the method of Example 30, wherein the spatial coordinates are obtained through a combination of geo-location systems, including global positioning system coordinates.

Example 32 may include the method of Examples 30 or 31, further including providing for registration of a geo-pane, and associating content with the geo-pane.

Example 33 may include the method of Example 30, further including establishing a rule set to determine whether content is to be made available.

Example 34 may include the method of Example 33, wherein the rules comprise a set of permissions.

Example 35 may include the method of Example 30, wherein the geo-pane is mobile.

Example 36 may include the method of Examples 30 or 35, wherein the content that is associated with a geo-pane varies with the orientation of a direction of gaze of a user.

Example 37 may include the method of Example 30, wherein the geo-fence is mobile.

Example 38 may include the method of any of Examples 30, 35, or 37, wherein the geo-panes are utilized in game play.

Example 39 may include the method of Example 38, wherein the game play includes using geo-panes associated with the layout of a city.

Example 40 may include a mobile device comprising one or more sensors, means for using sensor-based information from the one or more sensors to determine the location of the mobile device, means for using information from the one or more sensors to determine an orientation of the mobile device, and means for requesting the delivery of content to the mobile device based at least partly on the orientation of the device and its location.

Example 41 may include the mobile device of Example 40, further comprising means for controlling delivery of content.

Example 42 may include a system for providing location specific content, comprising a device for mapping the boundaries of a region, memory for receiving numerical information defining the boundaries of the region, content associated with the region, a location aware device having means to determine a direction of orientation of the location aware device and its location, and means to relate the orientation and the location of the location aware device to said content.

Example 43 may include the system of Example 42, further comprising access rules.

Example 44 may include a system to provide content to a device, comprising means for locating the device in space, means for determining the orientation of the device, means for storing content and relating it to a location in space, and means for providing content to the device in dependence upon its location and orientation.

Example 45 may include the system of Example 44, comprising means for controlling access to content.

Example 46 may include a method of providing content, comprising obtaining the Global Positioning System (GPS) coordinates of a device, determining a device orientation from at least one of accelerometer, magnetometer, and gyroscope data obtained from the device, said device orientation defining a gaze direction, accessing a data base containing the GPS coordinates of at least one geo-pane and rules for permitting access to data associated with the geo-pane, determining whether the gaze direction points to a geo-pane, and providing content to the device that is relevant to the geo-pane provided the rules are met.

Example 47 may include the method of Example 46, wherein the rules include limitations on the distance between the geo-pane and the device.

Example 48 may include the method of Example 46, further comprising game play.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. The descriptions provided are to be regarded as illustrative instead of limiting.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A system to provide content to a device comprising:
a geo-location module to determine device coordinates of the device within a coordinate system,
a gaze orientation module to determine a gaze direction of the device based on sensor-based information;
a geo-pane identification module to identify regions of space and associate content with said regions of space based on the gaze direction;
a content server; and
a geo-fence identification module to identify at least one fenced region of space bounded by a geo-fence, wherein content is additionally associated with said at least one fenced region of space.

2. The system of claim 1, further comprising a geo-location module to determine device coordinates within a coordinate system, wherein content is associated with said regions of space based on the device coordinates.

3. The system of claim 1, wherein at least one of the modules is integrated into a device that is wearable about a portion of a human body.

4. The system of claim 1, wherein content is associated with geo-panes and with a side of a geo-pane.

5. The system of claim 1, wherein said content and data defining geo-panes are registered to an owner.

6. The system of claim 1, further comprising a game controller for use in game play, wherein the game controller is to utilize the content.

7. The system of claim 1, wherein content is associated with said at least one fenced region of space based on the device coordinates.

8. The system of claim 1, further comprising a mobile device, wherein a user of the mobile device may select content based on an orientation of said device and on a side of a geo-pane.

9. A method to provide content to a device, comprising:
obtaining spatial coordinates and an orientation of a device, said orientation defining a gaze direction;
identifying a geo-pane based on the spatial coordinates and the gaze direction;
providing content to the device that is relevant to the geo-pane;
identifying at least one fenced region of a space bounded by a geo-fence;
determining whether the spatial coordinates of the device lie within said geo-fence; and
determining whether there are any geo-panes associated with said geo-fence, wherein providing the content to the device includes providing content concerning the geo-pane associated with the geo-fence.

10. The method of claim 9, wherein the geo-pane is three dimensional.

11. The method of claim 9, wherein the spatial coordinates are obtained through a combination of geo-location systems, at least one of which is local to the device.

12. The method of claim 9, further including registering ownership of a geo-pane with a registrar.

13. The method of claim 9, further including establishing a rule set to determine whether content is to be made available.

14. The method of claim 13, wherein the rule set comprises rules that control content delivery to devices located within a predetermined range of the geo-pane.

15. The method of claim 9, wherein the geo-pane is mobile.

16. The method of claim 9, wherein the content that is relevant to a geo-pane varies with a gaze direction of a user and with a side of the geo-pane.

17. The method of claim 9, wherein the geo-panes are utilized by a game controller in game play.

18. The method of claim 9, wherein content is associated with geo-panes.

19. At least one non-transitory computer readable storage medium comprising a set of instructions which, when executed by one or more servers, cause the server to:
obtain spatial coordinates and an orientation of a device, said orientation defining a gaze direction;
identify a geo-pane based on the spatial coordinates and the gaze direction;
provide content to the device that is relevant to the geo-pane;
identify at least one fenced region of space bounded by a geo-fence;
determine whether the spatial coordinates of the device lie within a geo-fence; and
determine whether there are any geo-panes associated with said geo-fence, wherein providing the content to the device includes providing content concerning a geo-pane associated with the geo-fence based on the gaze direction.

20. The at least one non-transitory computer readable storage medium of claim 19, wherein the instructions, when executed, cause the server to obtain spatial coordinates through a combination of geo-location systems, at least one of which is local to the device.

21. The at least one non-transitory computer readable storage medium of claim 19, wherein the instructions, when executed, cause the server to restrict content delivery to devices located within a predetermined range of the geo-pane.

22. The at least one non-transitory computer readable storage medium of claim 19, wherein the instructions, when executed, cause the server to vary delivery of content with the gaze direction and with a side of a geo-pane.

* * * * *